United States Patent
Feng et al.

(10) Patent No.: US 11,472,910 B2
(45) Date of Patent: Oct. 18, 2022

(54) POLYISOCYANATE COMPONENT, A POLYURETHANE FOAMING SYSTEM AND AN ARTICLE MADE THEREFROM

(71) Applicant: DOW GLOBAL TECHNOLOGIES LLC, Midland, MI (US)

(72) Inventors: Yanli Feng, Shanghai (CN); Weijun Zhou, Sugarland, TX (US); Luigi Bertucelli, Reggio Emilia (IT); Rajat Duggal, Pearland, TX (US); Yibei Gu, Redwood City, CA (US); Wei Liu, Shanghai (CN); Davide Micheletti, Formigine (IT)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/044,651

(22) PCT Filed: May 18, 2018

(86) PCT No.: PCT/CN2018/087581
§ 371 (c)(1),
(2) Date: Oct. 1, 2020

(87) PCT Pub. No.: WO2019/218372
PCT Pub. Date: Nov. 21, 2019

(65) Prior Publication Data
US 2021/0061939 A1    Mar. 4, 2021

(51) Int. Cl.
| | |
|---|---|
| *C08G 18/42* | (2006.01) |
| *B32B 5/20* | (2006.01) |
| *B32B 15/04* | (2006.01) |
| *B32B 15/095* | (2006.01) |
| *B32B 15/20* | (2006.01) |
| *C08G 18/64* | (2006.01) |
| *C08G 18/76* | (2006.01) |
| *C08G 18/80* | (2006.01) |

(52) U.S. Cl.
CPC .......... *C08G 18/4225* (2013.01); *B32B 5/20* (2013.01); *B32B 15/046* (2013.01); *B32B 15/095* (2013.01); *B32B 15/20* (2013.01); *C08G 18/6407* (2013.01); *C08G 18/7664* (2013.01); *C08G 18/8019* (2013.01); *B32B 2250/03* (2013.01); *B32B 2250/40* (2013.01); *B32B 2266/0278* (2013.01); *B32B 2307/304* (2013.01); *C08G 2110/0025* (2021.01)

(58) Field of Classification Search
None
See application file for complete search history.

(56) References Cited

U.S. PATENT DOCUMENTS

| | | | |
|---|---|---|---|
| 3,313,747 A | | 4/1967 | Schramm |
| 4,377,646 A | * | 3/1983 | Blount ................ C08G 18/003 521/154 |
| 4,728,676 A | | 4/1988 | Muller et al. |
| 4,788,224 A | | 11/1988 | Miller et al. |
| 5,112,932 A | | 5/1992 | Koenig et al. |
| 7,714,030 B2 | | 5/2010 | Lekovic et al. |
| 9,481,776 B2 | | 11/2016 | Wegener et al. |
| 9,758,961 B2 | | 9/2017 | Lotti et al. |
| 10,526,463 B2 | | 1/2020 | Hupka et al. |
| 2007/0059512 A1 | * | 3/2007 | Lekovic ............... C08G 18/797 521/159 |
| 2014/0093721 A1 | | 4/2014 | Wegener et al. |
| 2014/0121299 A1 | * | 5/2014 | Feng .................. C08G 18/7664 523/427 |
| 2016/0090436 A1 | | 3/2016 | Prissok et al. |
| 2016/0159999 A1 | | 6/2016 | Prissok et al. |
| 2017/0093721 A1 | | 3/2017 | Kano |

OTHER PUBLICATIONS

PCT/CN2018/087581, International Search Report and Written Opinion dated Jan. 30, 2019.
PCT/CN2018/087581, International Preliminary Report on Patentability dated Nov. 24, 2020.

* cited by examiner

*Primary Examiner* — Chinessa T. Golden

(57) ABSTRACT

A polyisocyanate component, a polyurethane foaming system, and an article made therefrom, wherein the polyisocyanate component includes (a) a preformed mixture including an aromatic oxazolidone compound that is the reaction product of at least one aromatic epoxide and at least one first polyisocyanate having an average isocyanate functionality of no more than 2.7 and greater than 1.8, in the presence of at least one catalyst, the aromatic oxazolidone compound includes at least one free isocyanate group and at least one aromatic oxazolidone group, the aromatic oxazolidone group includes an aromatic group and an oxazolidone group, and (b) at least one second polyisocyanate has an average isocyanate functionality equal to or greater than 2.7 and less than 6.0. The second polyisocyanate is added to the preformed mixture to form the polyisocyanate component. The polyisocyanate component has a viscosity of no more than 4.0 Pa-s at 25° C., an aromatic oxazolidone group content of 2 weight percent to 10 weight percent based on a total weight of the polyisocyanate component, and an average isocyanate functionality of from 1.8 to 6.0.

12 Claims, No Drawings

POLYISOCYANATE COMPONENT, A POLYURETHANE FOAMING SYSTEM AND AN ARTICLE MADE THEREFROM

FIELD

The present invention relates to a polyisocyanate component, a polyurethane foaming system including the polyisocyanate component; and a process of using the polyisocyanate component to make foam insulation products such as an insulated metal panel.

BACKGROUND

Known rigid foams can include polyisocyanurate rigid (PIR) foams, polyurethane rigid (PUR) foams or a combination of both PIR and PUR forms (referred to herein collectively as rigid polyurethane foams). Such rigid polyurethane foams are used for various applications such as building and construction, industrial, roofing, tanks, pipes, appliances, and the like. Rigid polyurethane (PU) foam are also known to be used in automotive applications for structural reinforcement, vibration dampening or sound dampening. Heretofore, significant efforts are being made towards improving the processability, friability, and/or thermal insulation performance of rigid polyurethane foams as there is a continuing demand, from users of such foams and from regulatory agencies of the government. However, in spite of the advancements made in providing rigid PU foams, there is still a need for PU foams having an increase in insulation performance and better mechanical properties for use in various applications.

SUMMARY

Embodiments may be realized by providing a polyisocyanate component that includes a preformed mixture including an aromatic oxazolidone compound that is the reaction product of at least one aromatic epoxide and at least one first polyisocyanate having an average isocyanate functionality of no more than 2.7 and greater than 1.8, in the presence of at least one catalyst, the aromatic oxazolidone compound includes at least one free isocyanate group and at least one aromatic oxazolidone group, the aromatic oxazolidone group includes an aromatic group connected to an oxazolidone group, and at least one second polyisocyanate has an average isocyanate functionality equal to or greater than 2.7 and less than 6.0. The second polyisocyanate is added to the preformed mixture to form the polyisocyanate component.

In general, the above preformed mixture and the above second polyisocyanate are mixed at a weight ratio from 10:1 to 1:10 and/or from 5:1 to 1:5. The polyisocyanate component beneficially has a viscosity of less than 4.0 Pa-s at 25° C., an aromatic oxazolidone group content of 2 weight percent (wt %) to 10 wt % based on a total weight of the polyisocyanate component, and an average isocyanate functionality from 1.8 to 6.0.

Embodiments may also be realized by providing a polyurethane foaming system including (A) the above polyisocyanate component; and (B) a polyol component. The polyurethane foams prepared using the polyurethane foaming system of the present invention provides rigid polyurethane foams showing good processability (e.g., a viscosity of the polyisocyanate component (A) of less than 4.0 Pa-s at 25° C.), low friability (e.g., a friability of foam of no more than 10%), and/or good thermal insulation performance (e.g., a K-factor of foam of no more than 20.5 mW/m-K at 10° C.).

Embodiments may also be realized by providing a process of using the above polyisocyanate component for forming a rigid polyurethane foam by reacting a mixture of the polyisocyanate component and a polyol component that includes at least one polyol with an average hydroxyl functionality of at least 1.8, wherein a ratio of isocyanate groups to isocyanate-reactive groups in the mixture is at least 1.6.

Embodiments may also be realized by providing a process of using the polyisocyanate component, which includes providing a first metal facer, and forming a rigid polyurethane foam on the first metal facer. The rigid polyurethane foam is the reaction product of a mixture of the polyisocyanate component and a polyol component that includes at least one polyol with an average hydroxyl functionality of at least 1.8, wherein a mole ratio of isocyanate groups to isocyanate reactive groups (e.g., hydroxyl groups) in the mixture is at least 1.6.

DETAILED DESCRIPTION

Rigid polyurethane (PU) foams are typically made by reacting a reactive polyurethane foam-forming composition, formulation or system which includes the reaction of a polyisocyanate component (a) comprising one or more polyisocyanate compounds with a polyol component (b) comprising one or more polyol compounds. The reaction may be carried out in the presence of (c) one or more blowing agents and/or (d) one or more catalysts such as described in U.S. Pat. No. 7,714,030. When the above components (a), (b), and optionally (c) and/or (d) are mixed and reacted, the reaction forms a polyurethane foam. According to exemplary embodiments, the polyisocyanate compound, component (a), includes (i) one or more polyisocyanate compounds and (ii) a novel aromatic oxazolidone unit (AOU)-containing polyisocyanate prepolymer (PP) compound.

One aspect of the present invention is directed to providing a polyisocyanate containing an aromatic oxazolidone structure (i.e., a predetermined percentage amount of an aromatic oxazolidone group or unit) incorporated into the polyisocyanate's chain structure; and thus, forming the AOU-containing PP compound. For example, the aromatic oxazolidone unit (AOU) incorporated into the structure of a polyisocyanate prepolymer can be at least one structural unit having the structure as shown in the following general Formula (I):

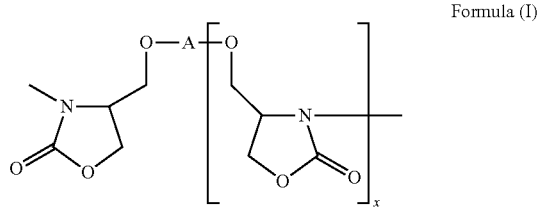

Formula (I)

wherein A can be an aromatic structure including a structural unit derived from compounds such as phenol, bisphenol-A, bisphenol F, epoxy novolac, other aromatic epoxides, and mixtures thereof; and X can be a numeral value of 0 or 1.

For example, A can include any one or more of the following structural units of Formula (II), Formula (III), and Formula (IV):

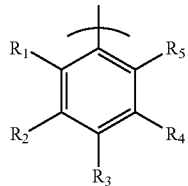

Formula (II)

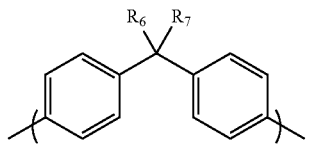

Formula (III)

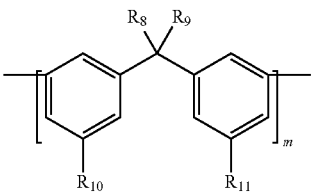

Formula (IV)

wherein in Formula (II), when X is 0, $R_1$-$R_5$ may be a hydrogen (H), methyl ($CH_3$) or ethyl ($C_2H_5$) group; and $R_1$-$R_5$ may be the same or different; and when X is 1, the oxygen in the oxazolidone structure is bonded to A in the para position (the $R_3$ bond); or when X is 1, the oxygen in the oxazolidone structure is bonded to A in the meta position (the $R_4$ bond); wherein in Formula (III), X is 1 and $R_6$ and $R_7$ may be H, $CH_3$ or $C_2H_5$ group; and $R_6$ and $R_7$ may be the same or different; and wherein in Formula (IV), X is 1 and $R_8$-$R_{11}$ may be H, $CH_3$ or $C_2H_5$ group; and $R_8$-$R_{11}$ may be the same or different; and m can be a numeral value of 1 to 20.

The above AOU of any of the above Formulas (I)-(IV) can be reactively incorporated into the polyisocyanate chain structure to form the AOU-containing PP compound. For example, when structure unit of Formula (III) is incorporated into a polyisocyanate chain, the following polyisocyanate structure shown in the following Formula (V)) can be obtained:

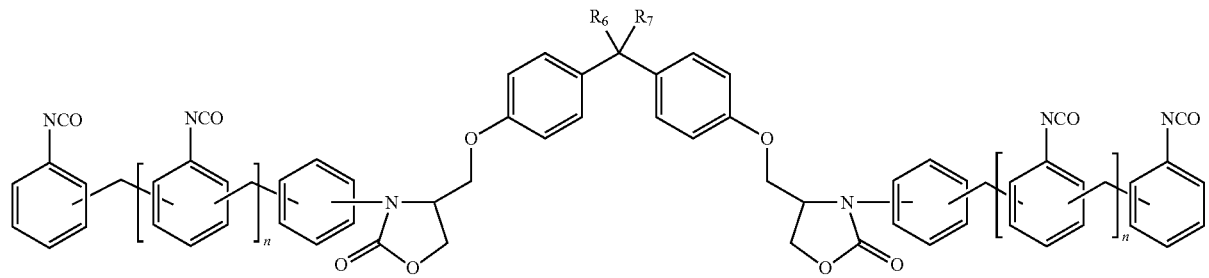

Formula (V)

where $R_6$ and $R_7$ are the same groups as described with reference to Formula (II); and n can be a numeral value of 0, or greater than or equal to 1 and up to a value of 6, i.e., including 2, 3, 4, 5 or 6.

The present invention includes using the above rigid AOU-containing PP compound for preparing a rigid polyurethane (PU) foam. It has been surprisingly found that a predetermined amount of the above AOU used in the polyisocyanate component of the foam-forming composition with a low viscosity is particularly advantageously useful for improving the insulation and mechanical properties of a foam without the processing difficulty for polyurethane or polyisocyanurate foam applications such as insulated metal panel fabrication.

In particular, it has been discovered that by incorporating an AOU (a backbone with aromatic oxazolidone rings shown in Formula (I) above) in a polyisocyanate chain, a low viscosity (e.g., less than 4,000 mPa-s or equivalently 4 Pa-s) novel polyisocyanate compound can be prepared. If the viscosity of the AOU-containing PP compound is higher than 4,000 mPa-s, it may be very difficult to process the polyisocyanate in the foam manufacturing process. Thus, it is advantageous to provide a polyurethane foaming system that includes a polyisocyanate component containing an aromatic oxazolidone compound and such that the polyisocyanate component has a viscosity of no more than 4.0 Pa-s at 25° C. In one embodiment, the content of the AOU in the polyisocyanate component can be generally from 2 wt % to 10 wt % based on a total weight of the polyisocyanate component. And, the polyisocyanate component can also have an average isocyanate functionality of from 1.8 to 6.0. Whether the polyurethane foaming system is prepared by a one-step or a two-step process or other process as described herein, the type of polyurethane foaming systems prepared as described herein beneficially can have an Isocyanate Index of between 1.6 and 6.

The amount of AOU incorporated into the AOU-containing PP compound may be from 2 wt % to 10 wt % based on the total amount of the polyisocyanate component (a); from 3 wt % to 7 wt %, and/or in the range of from 3 wt % to 6 wt %. The above AOU percentage amount incorporated into the polyisocyanate can be calculated based on the following general structure shown below as Formula (VI):

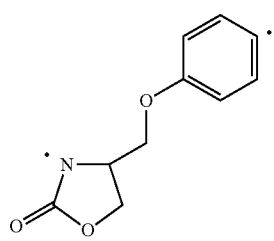

Formula (VI)

In an exemplary embodiment, the polyisocyanate component (a) includes (i) at least one polyisocyanate compound; and (ii) a preformed mixture that includes an AOU-containing PP compound that contains free isocyanate groups and aromatic oxazolidone groups; wherein the polyisocyanate component has a viscosity of less than 4 Pa-s at 25° C.; and wherein the amount of AOU in the polyisocyanate component is from 2 wt % to 10 wt % based on the total amount of the polyisocyanate component (a). In addition, the polyisocyanate component generally has an isocyanate equivalent weight of from 125 to 400 and/or from 130 to 400.

The polyisocyanate component (a) has a specific amount of AOU which provides a low viscosity polyisocyanate component (a) adapted for ease of foam processing, for example at room temperature (e.g., approximately 25° C.). The resulting polyurethane foam product may surprisingly exhibit improved foam properties in terms of better thermal insulation performance through a reduction of thermal conductivity or commonly referred to as "k-factor" or "lambda value". "K-factor" can be defined as the rate at which heat flows through a material. Another property of the foam product may be its strong mechanical toughness. "Mechanical toughness" can be defined as the ability of a form to absorb energy and plastically deform without breaking. Mechanical toughness of rigid PUR or PIR foams can be measured by their friability property which is the tendency of a solid substance to break into smaller pieces under force or by contact, especially by physical rubbing. In addition, the polyurethane foams, e.g., due to the unique feature of low viscosity for the rigid AOU-containing PP compound, component (aii), are adaptable for use in much higher Isocyanate Index foams which use significantly higher mass amount of polyisocyanate for foam fabrication (for example, foams with an Isocyanate Index higher than 1.6) compared to conventional polyurethane foams. "Isocyanate Index" is the equivalents of isocyanate groups (i.e., NCO moieties) present, divided by the total equivalents of isocyanate-reactive groups, such as hydroxyl groups present. Considered in another way, the Isocyanate Index is the mole ratio of the isocyanate groups over the isocyanate reactive hydrogen groups in a formulation. In general, the Isocyanate Index of the polyurethane foaming system of the present invention can be between 1.6 and 6, between 2 and 6, and/or between 2.5 and 5.

The novel AOU-containing PP compound present in the polyisocyanate component (a) may be prepared by reacting (α) at least one isocyanate compound with (β) at least one aromatic epoxide compound in the presence of (γ) at least one oxazolidone-forming catalyst. In general, an excess amount of isocyanate groups is present in the reaction mixture of components (α), (β) and (γ) at a ratio of isocyanate groups to epoxide groups of from 3:1 to 30:1 on a molar basis.

The AOU-containing PP compound, component (aii) is manufactured by reactively incorporating the rigid AOU into a polyisocyanate compound by reacting an excess amount of isocyanate groups with epoxide groups, forming an aromatic oxazolidone compound. Essentially all epoxide groups may be pre-incorporated into the polyisocyanate chain as an oxazolidone structure forming the AOU-containing PP compound. Hence, there may be little to no free epoxide groups in the resulting isocyanate group-containing aromatic prepolymer compound. In addition, during the preparation of the AOU-containing PP compound, there may be no need to use a stabilizer (such as used in the process described in WO2016131878) to stop the full reaction between the epoxide and the isocyanate. An example of a process that can be used for producing the AOU-containing PP compound useful in the present invention is generally described in U.S. Pat. No. 7,714,030.

Suitable isocyanate compounds useful for preparing the AOU-containing PP compound can include, for example, aromatic, aliphatic and cycloaliphatic polyisocyanates. Aromatic polyisocyanates may be preferred based on cost, availability and properties, and aliphatic polyisocyanates may be preferred in instances where stability to light is important. Exemplary polyisocyanate compounds include, for example, m-phenylene diisocyanate, 2.4- and/or 2.6-toluene diisocyanate (TDI), the various isomers of diphenylmethanediisocyanate (MDI), the so-called polymeric MDI products (which are a mixture of polymethylene polyphenylene isocyanates in monomeric MDI), carbodiimide-modified MDI products (such as the so-called "liquid MDI products which have an isocyanate equivalent weight in the range of 135-170), hexamethylene-1,6-diisocyanate, tetramethylene-1,4-diisocyanate, cyclohexane-1,4-diisocyanate, hexahydrotoluene diisocyanate, hydrogenated MDI (HMDI), naphthylene-1,5-diisocyanate, methoxyphenyl-2, 4-diisocyanate, 4,4'-biphenylene diisocyanate, 3,3'-dimethyoxy-4,4'-biphenyldiisocyanate, 3,3'-dimethyldiphenyl methane-4,4'-diisocyanate, 4,4',4'-triphenylmethane diisocyanate, hydrogenated polymethylene polyphenylisocyanates, toluene-2,4,6-trisocyanate and 4,4'-dimethyldiphenyl-methane-2.2".5,5'-tetraisocyanate. Especially suitable polyisocyanate includes various isomers of diphenylmethanediisocyanate (MDI) and polymeric MDI products have an average functionality (number of isocyanate groups per molecule) of no higher than 2.7 and the wt % of NCO no less than 25 wt %. Such polymeric MDI products are available from The Dow Chemical Company under the tradename PAPI™.

The amount of the isocyanate compound used to make the AOU-containing PP compound for the foam composition, may be in the range of from 65 wt % to 98 wt %; from 70 wt % to 97 wt %; from 75 wt % to 95 wt %; and/or from 75 wt % to 90 wt %, based on the weight of the combination of the isocyanate compound and epoxide.

The polyepoxide(s) useful for preparing the oxazolidone pre-polymer may be solid or liquid at room temperature. If a solid, the polyepoxide may be heat softenable at an elevated temperature of between 50° C. and 150° C. Mixtures of solid and liquid (at room temperature) polyepoxides can be used. The polyepoxide or a mixture thereof suitably has an average epoxide equivalent weight of from 150 to 800, 170 to 400 and/or 170 to 250. Individual polyepoxides contained in a mixture may have equivalent weights outside of that range. A wide variety of polyepoxide compounds, such as cycloaliphatic epoxides, epoxidized novolac resins, epoxidized bisphenol A or bisphenol F resins can be used, but may be preferred on the basis of cost and availability are liquid or solid glycidyl ethers of a bisphenol such as bisphenol A or bisphenol F. Halogenated, particularly brominated, polyepoxides can be used to impart flame retardant properties if desired. Polyepoxides of particular interest are polyglycidyl ethers of bisphenol A or bisphenol F having an epoxy equivalent weight of 150 to 800. Blends of one or more polyglycidyl ethers of bisphenol A or bisphenol F. The epoxy resin may be halogenated (in particular, brominated) if desired in order to impart flame resistance.

Suitable polyepoxides useful in the present invention are commercially available. Among these are liquid polyepoxides such as D.E.R. 317, D.E.R. 330, D.E.R. 331, D.E.R. 332, D.E.R. 336, D.E.R. 337 and D.E.R. 383; solid polyepoxides such as D.E.R. 642U, D.E.R. 661, D.E.R. 662, D.E.R 663, D.E.R. 671, D.E.R. 672U, D.E.R. 692, D.E.R. 6155, D.E.R. 666E, D.E.R. 667-20, D.E.R. 667E, D.E.R. 668-20, D.E.R. 669-60, D.E.R. 669E and D.E.R 6225; brominated polyepoxides such as D.E.R. 542, D.E.R. 560 and D.E.R. 593; epoxy novolac resins such as D.E.N. 425, D.E.N. 431, D.E.N 438 and D.E.R. 439; and mixtures thereof; all of which are available from Olin.

In an exemplary embodiment, the epoxy compounds useful for preparing the oxazolidone pre-polymer can include, for example, brominated aromatic epoxy resins, non-brominated epoxy resins. bisphenol A epoxy resins, bisphenol F epoxy resins, phenol novolac epoxy resins, cresol-novolac epoxy resins, biphenyl epoxy resins, naphthalene epoxy resins, divinylbenzene dioxide, and mixture thereof.

The amount of the epoxide used to make the AOU-containing PP compound for the foam composition, may be in the range of from 2 wt % to 35 wt %; from 3 wt % to 30 wt %; from 5 wt % to 25 wt %; and/or from 10 wt % to 25 wt %, based on the weight of the combination of the isocyanate compound and epoxide.

The reaction of the polyepoxide and the polyisocyanate to form the AOU-containing PP compound may occur in the presence of at least one catalyst. A variety of catalysts for this reaction are known, including the catalysts disclosed in U.S. Pat. No. 7,714,030. For example, the catalysts used include $Ph_3SbI_4$, $Ph_3SbI_2$, quaternary ammonium, zinc carboxylate, organozinc chelate compound, trialkyl aluminum, quaternary phosphonium and ammonium salts, tertiary amines, imidazole compounds, 1,8-diazabicyclo[5.4.0]undec-7-ene, and mixtures thereof. In an exemplary embodiment, the catalysts can be $Ph_3SbI_4$, $Ph_3SbI_2$, 1,8-diazabicyclo[5.4.0] undec-7-ene, 2-phenylimidazole, 2-methylimidazole, 2-ethyl-4-methylimidazole, and mixtures thereof.

The amount of the catalyst used can be in the range of from 5 mole % to 0.1 mole %; from 3.5 mole % to 0.5 mole % and/or from 3 mole % to 1 mole %, with respect to the total moles amount of epoxide used in the synthesis of AOU-containing PP compound.

In addition to the catalysts above, other optional compounds that can be added to the AOU-containing PP compound may include for example, a plasticizer or a surfactant such as those described in U.S. Pat. No. 7,714,030.

The polyisocyanate component, component (a), may include for example a single polyisocyanate or a mixture of two or more different polyisocyanates, provided that at least one of the polyisocyanates is the AOU-containing PP compound. In general, suitable polyisocyanate compounds useful in the polyisocyanate component (a) can include any one or more of the same aromatic, aliphatic and/or cycloaliphatic polyisocyanates described above with reference to producing the AOU-containing PP compound. The polyisocyanate component (a) has an average functionality of isocyanate groups of at least 2.3 and/or preferably at least 2.5.

In exemplary embodiments, the polyisocyanate component, component (a), may contain from 2 wt % to 10 wt % of the AOU (for example, the compound of Formula (VI)) in the polyisocyanate component (a); or the polyisocyanate component, component (a), may contain from 3 wt % to 7 wt % of the AOU (e.g., Formula (VI)) in the polyisocyanate component (a).

The polyol component, component (b), may include for example a single polyol or a mixture of two or more different polyols. In an exemplary embodiment, the polyol component includes a blend of two or more different polyols. The functionality (average number of isocyanate-reactive groups/molecule) of the polyol component can be, for example at least 1.8 and/or preferably at least 2.0.

Suitable polyol compounds useful as component (b) may include polyester polyols, polyether polyols, polycarbonate polyols, and mixtures thereof. The polyol component (b) may include other polyols such as alkylene glycols chain extenders.

In general, concentration of the polyol component (b) may be from 10 wt % to 50 wt %, from 15 wt % to 40 wt % and/or from 20 wt % to 35 wt %, based on the total weight of all components in the foam formulation.

Generally, the amount of polyisocyanate component (a) used in the foam formulation can depend on the end use of the foam composition. As one illustrative embodiment the concentration of the polyisocyanate component (a) may be from 50 wt % to 90 wt %, from 60 wt % to 85 wt %; and/or from 65 wt % to 80 wt %, based on the total weight of all components in the foam formulation.

A variety of conventional blowing agents can be used as component (c). For example, the blowing agent can be one or more of water, various hydrocarbons, various hydrofluorocarbons, various hydrofluoroolefins, formic acid, a variety of chemical blowing agents that produce nitrogen or carbon dioxide under the conditions of the foaming reaction, and the like; and mixtures thereof.

The chemical blowing agent such as water can be used alone or mixed with other chemical and/or physical blowing agents. Physical blowing agents can be used as low-boiling hydrocarbons. Examples of such used liquids are alkanes, such as heptane, hexane, n- and iso-pentane, technical grade mixtures of n- and isopentanes and n- and iso-butane and propane, cycloalkanes such as cyclopentane and/or cyclohexane, ethers, such as furan, dimethyl ether and diethyl ether, ketones such as acetone and methyl ethyl ketone, alkyl carboxylates, such as methyl formate, dimethyl oxalate and ethylene lactate and halogenated hydrocarbons such as methylene chloride, Dichloromonofluoromethane, difluoromethane, trifluoromethane, difluoroethane, tetrafluoroethane, chlorodifluoroethanes, 1,1-dichloro-2,2,2-trifluoroethane, 2,2-dichloro-2-fluoroethane, pentafluoropropane, heptafluoropropane and hexafluorobutene, Solstice®LBA from Honeywell. Mixtures of these low boiling liquids with each other and/or with other substituted or unsubstituted hydrocarbons can also be used. Also suitable are organic carboxylic acids such as formic acid, acetic acid, oxalic acid, Ricinolsäu-Re and carboxyl-containing compounds.

The blowing agent, component (c), may be added to the polyisocyanate component (a) or to the polyol component (b), or to both components (a) and (b). For example, in an exemplary embodiment, the amount of blowing agent, component (c), used in the foam formulation may range generally from 0.01 wt % to 40 wt % in the polyol component side and/or from 10 wt % to 30 wt % in the polyol component side.

A variety of catalysts can be used as component (d). For example, the catalyst may include tertiary amines; tertiary phosphines; chelates of various metals; acidic metal salts of strong acids; salts of organic acids with variety of metals; other conventional catalysts used in foam forming compositions; and mixtures thereof.

The catalyst, component (d), may be added to the polyisocyanate component (a) or to the polyol component (b), or to both components (a) and (b). For example, the amount of catalyst, component (d), used in the foam formulation may range generally from 0.01 wt % to 10 wt % in the polyol component side and/or from 0.1 wt % to 5 wt % in the polyol component side.

Other optional compounds or additives that may be added to the foam formulation may include additives known in the art for use in foam formulations and/or rigid polyurethane foam formulations. Examples include toughening agents, flow modifiers, adhesion promoters, diluents, stabilizers, plasticizers, catalyst de-activators, flame retardants, fillers, smoke suppression agents, liquid nucleating agents, solid nucleating agents, Ostwald ripening retardation additives, and mixtures thereof.

The amount of optional compounds or additives present in the foam formulation can be generally in the range of from 0 wt % to 20 wt %, 0.1 wt % to 15 wt %, and/or 0.5 wt % to 12 wt %, based on the total formulation weight.

Generally, the process for making the reactive foam composition includes admixing components (a) and (b) described above; and optionally adding a blowing agent and a catalyst, components (c) and (d), respectively, to the foam composition. Generally, the preparation of the foam composition includes providing at least one polyisocyanate component (a) which can also be referred to herein as the "A-side" of the foam composition; and providing at least one polyol component (b) which can also be referred to herein as the "B-side" of the foam composition. The blowing agent component (c) and the catalyst component (d) may be added to the foam formulation into (1) the component (a) or A-side; (2) the component (b) or B-side, or (3) both component (a) (A-side) and component (b) (B-side); and the blowing agent and catalyst can be added before the components (a) and (b) are mixed together or after the components (a) and (b) are mixed together. One or more additional optional components may be added to the polyisocyanate component (a) and/or to the polyol component (b) of the formulation as desired.

In preparing the foam composition, the A-side and the B-side are separately and individually prepared with the ingredients (a)-(d) and the other optional ingredients, if any; and all of the components can be mixed together in the desired concentrations discussed above to prepare the foam composition. In general, the mole ratio of the isocyanate groups in the A-side to the isocyanate-reactive groups in the B-side can be in the range of from 1.6:1 to 6:1 and/or from 2.5:1 to 4.5:1. The mixing of the components can be carried out at a temperature of from 5° C. to 80° C.; from 10° C. to 60° C.; and/or from 15° C. to 50° C. The order of mixing of the ingredients is not critical and two or more compounds can be mixed together followed by addition of the remaining ingredients. The ingredients that make up the foam composition may be mixed together by any known mixing process and equipment. For example, the polyisocyanate component premix (A-side) and the polyol premix (B-side) can be mixed together by any known urethane foaming equipment.

The foam formulation produced by the process of the present invention may have several advantageous properties and benefits. For example, the foam formulation includes a low viscosity polyisocyanate component (a) containing a low viscosity AOU-containing PP compound, component (aii), and the use of such low viscosity polyisocyanate component (aii) provides a foam formulation that is easily handled during the foam manufacturing process and the processes for making insulated metal panels or discontinuous panels.

The viscosity of the polyisocyanate component (a) containing the AOU-containing PP compound, component (aii), i.e., the A-side of the foam composition, can be, for example, from 500 mPa-s to 4,000 mPa-s, from 750 mPa-s to 3,500 mPa-s, and/or from 1,000 mPa-s to 3,000 mPa-s. In an exemplary embodiment, the viscosity of the polyisocyanate component (a) may be less than or equal to 4,000 mPa-s at 25° C. and/or less than or equal to 3,000 mPa-s at 25° C.

The A-side and B-side are generally mixed together using an impingent mixing processing equipment. If the viscosity of the A-side (or for the same reason, the B-side) is too high (e.g., greater than 4,000 mPa-s), the processing equipment will not be able to handle the pumping of the A-side. In addition, the mixing of the B-side with the A-side will be poor due to the large difference between the viscosity of the A-side and the B-side. To reduce the possibility of this viscosity mismatching, a low viscosity A-side may be preferred. However, even though the incorporation of AOU into polyisocyanate can quickly lead to a viscosity rise in the A-side, if the viscosity of the A-side is less than 500 mPa-s, the amount of AOU in the AOU-containing PP compound is too small to be effective in imparting the property improvements described herein.

In general, a process for making the rigid foam includes admixing and reacting components (a) and (b) described above as introduced by way of an A-side and a B-side. The rigid foam/rigid polyurethane foam generally has a density of from 20 g/cm$^3$ to 60 g/cm$^3$. In exemplary embodiments, the density of the rigid polyurethane foam may be from 25 g/cm$^3$ to 60 g/cm$^3$, 30 g/cm$^3$ to 60 g/cm$^3$, 35 g/cm$^3$ to 60 g/cm$^3$ and/or 35 g/cm$^3$ to 50 g/cm. For example, the A-side comprises the polyisocyanate component (a), includes one or more polyisocyanate compounds wherein at least one of the polyisocyanate compounds is the AOU-containing PP compound; and the B-side comprises the polyol component (b) includes one or more polyol compounds. The A-side and/or the B-side can include any of a number of optional components or additives. For example, the B-side may include a blowing agent and a catalyst.

To manufacture a rigid foam, the A-side may be mixed with the B-side, at ambient temperature and at the desired ratio, forming the reactive formulation. In one embodiment, the A-side:B-side ratio is 0.5:1 to 4:1 by weight. The resulting reactive blend is subjected to conditions sufficient to allow the foaming reaction to occur and to cure the reactive formulation to form a rigid foam. For example, the mixture of the A-side and B-side can be heated at an elevated temperature to cure the foam composition. The components can be heated at a temperature of from 25° C. to 80° C., from 35° C. to 70° C. and/or from 45° C. to 60° C.

The conventional process and equipment to make the rigid foam such as a polyisocyanurate rigid (PIR) foam, a polyurethane rigid (PUR) foam or a combination of both PIR and PUR forms can include for example the A-side may be mixed with the B-side, at ambient temperature (approximately 25° C.) and at the desired ratio. The mass ratio of the A-side (polyisocyanate side) to the B-side (polyol side), forming the reactive formulation, can be generally at a ratio from X:1 to Y:1, wherein X can be a value of less than 1 and Y can be in the range of from 1 to 6. For example, in one embodiment the mass ratio A-side/B-side can be 0.5:1 to 6:1. The resulting reactive blend is subjected to conditions sufficient to allow the foaming reaction to occur and to cure the reactive formulation to form a rigid foam.

Various methods may be used to fabricate insulation products incorporating a rigid polyurethane foam, e.g., a continuous double belt lamination process for making insulated metal panels with a rigid metal facer (such as steel facer) on both the top and bottom surface of the panels; a continuous process of making board stock foam with flexible facers, such as aluminum foil or paper and the like, at both sides of the foam; a discontinuous process of making insulation panels or articles of three dimension shape by injecting the reactive formulation into a mold cavity followed by a subsequent curing of the formulation in the mold at a temperature in the range of from 25° C. to 80° C. for a desirable amount of time; and other processes. Skilled artisans may adapt the reaction kinetics of the present information to achieve a best mold filling and foam curing for the most economical manufacturing.

The method that may be used to fabricate insulation products, may be the aforementioned continuous double belt lamination process. This process may include a moving top belt and a bottom belt each with heating elements and pressure mechanisms that transfer heat and pressure to the products between the belts. One of the advantages of using the double belt lamination process and equipment may be its ability to continuously hold the product under heat for a desired period of time and then to cool the product to set in place.

Generally, the insulation performance property of the rigid foam as measured by thermal conductivity (or "K-factor") as defined and determined by the procedure described in AS™ C518-04 (2010) would preferably be no more than a K-factor of 20.5 mW/m-K at 10° C. In exemplary embodiments, the K-factor can be from 16 mW/m-K to 20.5 mW/m-K, from 17 mW/m-K to 20 mW/m-K, and/or from 18 mW/m-K to 19.5 mW/m-K.

In general, the rigid foam may have a mechanical toughness, as measured in terms of percentage of friability as defined and determined by the procedure described in ATSM C 421 (2014), of no more than a friability of 10%. In exemplary embodiments, the friability of the rigid foam can be in the range of from 0.1% to 10%, from 0.5% to 7%, and/or from 1% to 5%.

EXAMPLES

The following examples are presented to further illustrate the present invention in detail but are not to be construed as limiting the scope of the claims. Unless otherwise stated all parts and percentages are by weight.

Various raw materials used in the examples which follow are explained hereinbelow in Table I.

TABLE I

| Material | Material Description | Supplier |
|---|---|---|
| Polyol O | Terephthalic acid based polyester polyol having OH number 215 and functionality 2 | The Dow Chemical Company (Dow) |
| Polyol F | Terephthalic acid based polyester polyol having OH number 315 and functionality 2.4 | Dow |
| STEPANPOL ® PS-2412 | Polyol with an OH number of ~240 | Stepan Company |
| STEPANPOL ® PS-3024 | Polyester polyol with an OH number of ~310 | Stepan Company |
| VORANOL ™ RN482 | Polyol with an OH number of ~482 | Dow |
| VORANOL ™ SD301 | Polyol with an OH number of ~156 | Dow |
| VORANOL ® RA640 | Polyol with an OH number of ~640 | Dow |
| TEP (triethyl phosphate) | Flame retardant | Jiangsu Yoke, ICL |
| SPE Surfactant 1 | Surfactant | Jiangsu Maysta |
| SPE Surfactant 2 | Surfactant | Evonik |
| DABCO ® K2097 | Catalyst | Air Products |
| POLYCAT ® 5 | Catalyst | Air Products |
| UR5960 | Catalyst | Aosijia |
| Water | Blowing agent | |
| Cyclopentane (CP) | Blowing agent | Beijing Eastern Acrylic Chemical |
| Solstice LBA | Liquid blowing agent | Honeywell |
| PAPI ™ 27 | Polyisocyanate with NCO functionality of 2.7 | Dow |

TABLE I-continued

| Material | Material Description | Supplier |
|---|---|---|
| ISONATE ™ 143L | Modified Isocyanate with an NCO functionality of 2.17 | Dow |
| ISONATE ™ 50 O, P' | Isocyanate with an NCO functionality of 2 | Dow |
| PAPI ™ 94 | Polyisocyanate with an NCO functionality of 2.3 | Dow |
| PAPI ™ 580N | Polyisocyanate with an NCO functionality of 3.0 | Dow |
| VORANATE ™ M600 | Polyisocyanate with an NCO functionality of 3.0 | Dow |
| D.E.R. ™ 332 | Aromatic epoxy | Olin |
| D.E.R. ™ 736 | Aliphatic epoxy | Olin |
| D.E.R. ™ 331 | Aromatic epoxy | Olin |
| D.E.R. ™ 383 | Aromatic epoxy | Olin |
| $I_2$ | Catalyst | Sinopharm |
| $Ph_3Sb$ (triphenyl antimony) | Catalyst | Sinopharm |

Notes for Table I:
VORANOL, PAPI and ISONATE are registered trademarks of The Dow Chemical Company; STEPANOL is a registered trademark of Stepan Company; DABCO and POLYCAT are registered trademark of Evonik; D.E.R. is a registered trademark of Olin; and SOLSTICE is a registered trademark of Honeywell.

Synthesis Example 1

Preparation of Comparative Example (Comp. Ex.) P-A

Into a 0.5-liter (L) oven-dried four-necks round bottom flask purged with $N_2$, was added a mixture of 106 grams (g) of PAPI 27, 11.6 g of D.E.R. 383, 0.35 g of $I_2$ and 0.26 g of $Ph_3Sb$. The mixture was stirred by an overhead mechanical stirrer at 350 revolutions per minute (rpm) and heated to 100° C. under nitrogen ($N_2$) using a heating mantle. The mixture was kept at 100° C. for 60 minutes (min) to allow the mixture to react. Then the heating mantle was removed when the temperature dropped to 60° C. Thereafter, the resulting reaction product was transferred into a bottle and cooled down under $N_2$. The reaction product was kept under $N_2$ and the bottle was sealed using electrical tape to reduce the possibility of moisture entering the bottle.

In FTIR, the peaks at 915-917 $cm^{-1}$ are mainly from free epoxide and minor from the isocyanate. FTIR analysis of the final product of Comp. Ex. P-A showed the peaks at 915-917 $cm^{-1}$ almost disappeared due to the complete reaction of epoxy with isocyanate and only a tiny peak associated with the isocyanate remained unchanged after the reaction. A new peak at ~1753 cm-1 characteristic of the oxazolidone structure occurred in the FTIR spectra, indicating the reactive formation of oxazolidone structure in this polyisocyanate. $^{13}C$-NMR analysis of the final product of Comp. Ex. P-A also indicated that the epoxy conversion was achieved at 99% and higher, as there were no chemical shifts associated with non-reacted epoxy groups (peaks at 50 parts per million (ppm) and at 44.5 ppm) can be detected.

The NCO % of the final product was measured to be approximately 26% and the viscosity of the product was determined to be 37 Pa-s at 25° C. This oxazolidone containing polyisocyanate prepared from this polymeric MDI PAPI 27 in a one-step process was too viscous to process into a rigid foam (AOU=10.4 wt % based on calculation).

Synthesis Example 2

Preparation of Inventive Example (Inv. Ex.) P-1

Into a 2 L oven-dried four-necks round bottom flask purged with $N_2$, was added a mixture of 341.8 g of PAPI 94, 72.5 g of D.E.R.332, 3.45 g of $I_2$ and 2.38 g of $Ph_3Sb$. The mixture was stirred by an overhead mechanical stirrer at 250 rpm and heated to 95° C. under $N_2$ using a heating mantle. When temperature reached ~85° C., a rapid exothermal reaction occurred and the reaction mixture quickly reached up to about 160° C. The heating mantle was removed and the resultant reaction mixture was allowed to digest for 30 min. After the reactor cooled down to 60° C., 847.4 g of PAPI 580N was charged to the reactor and the mixture was stirred for another ~45 min.

The resultant reaction product was transferred into a bottle. The bottle contents were kept under $N_2$ and the bottle was sealed using electrical tape to prevent any moisture from entering the bottle.

The NCO % of the final product of Inv. Ex. P-1 was measured to be approximately 28.3%. From FT-IR measurements, the oxazolidone peak was found at ~1753 $cm^{-1}$ and the epoxy peak originally at 915-917 $cm^{-1}$ disappeared. Similar to Comp. Ex. P-A, NMR analysis of the final product of Inv. Ex. P-1 did not show any chemical shifts related to epoxy signals (peaks at 50 ppm and at 44.5 ppm), again indicating that the epoxy conversion was achieved at 99% and higher.

The viscosity of the final product of Inv. Ex. P-1 was around 3.1 Pa-s at room temperature (AOU=6.4 wt % based on calculation). The low viscosity of Inv. Ex. P-1 is highly desirable for foam processing. Obtaining a low viscosity polyisocyanate component (a) is possible because of a two-step process for preparing the polyisocyanate, wherein the first step is the reaction between an epoxide and a low functionality polymeric MDI. This first reaction minimizes the formation of a high molecular weight oligomer and more branched oxazolidone-containing prepolymer which can lead to a substantially high viscosity prepolymer as shown in Comp. Ex. P-A. The second step of the process is the addition of a high functionality polyisocyanate (for example, PAPI 580N) to the polyisocyanate component (a); and this second step is important because this second step raises the total functionality of NCO group and NCO content of the polyisocyanate component (a) to levels of at least 2.3 and 25 wt %, respectively, for example, at least 2.5 and 26 wt %, and/or at least 2.6 and 28 wt %, respectively. When the functionality of the AOU-containing polyisocyanate is lower than 2.3, the degree of chemical crosslinking may get compromised particularly in the case of PIR foams for which a high degree of crosslinking among polyisocyanate molecules is necessary to achieve adequate mechanical strength or in the case of foam formulations where the average functionality of the polyol side is at approximately 2 or just slightly higher than 2. In the latter case, a high degree of crosslinking between polyols and polyisocyanate will be difficult to achieve if both have a functionality at just approximately 2.

When the NCO % content of the AOU-containing PP compound is lower than 25 wt %, considerably more amount of polyisocyanate is needed for making PUR or PIR foams at the same Isocyanate Index. This may cause several complications. First, the mixing ratio of the polyol stream (B-side) and the polyisocyanate stream (A-side) for foam manufacturing may deviate significantly from the ideal situation of best mixing which requires about equal volumes for two streams. Secondly, an excessively high usage amount of polyisocyanate in a foam formulation can result in foams with poor mechanical toughness and high friability.

A two-step process of making an aromatic oxazolidone compound containing polyisocyanate component (a) also has advantage of minimizing the amount of isocyanurate trimer present in the final polyisocyanate component. This is because the isocyanurate trimer formation is limited to the first step of the reaction between aromatic epoxide and polyisocyanuate occurring at an elevated temperature of between about 100° C. and 160° C. The formation of isocyanurate trimer structure can lead to substantial viscosity increase which is undesirable for foam processing.

Synthesis Examples 3 to 9

Preparation of Polyisocyanates of Comparative Examples P-B, P-D to P-G, and Inventive Example P-2

The products of Comp. Ex. P-B, P-D to P-G and Inv. Ex. P-2 were prepared by using the same synthesis procedure of Comp. Ex. P-A or Inv. Ex. P-1, as the case may be, with the prescribed amounts of reagents and a proper sized reaction vessel. In all cases, the reaction temperature was carefully monitored by adjusting the heating mantle output to ensure the reaction between epoxide group and NCO group occurred at a temperature range of between 100° C. to 170° C. The results of the above Synthesis Examples are described in Table II.

Comp. Ex. P-B was prepared from an aliphatic epoxide DER 736 that has about the same epoxide equivalent Mw to that of an aromatic epoxide (such as DER 383 and DER 332). The polyisocyanate prepared from DER 736 does have a low viscosity, but the polyisocyanate prepared from DER 736 contains no aromatic oxazolidone groups in the polymer chain. Unexpectedly, the polyisocyanate prepared from DER 736 was found to be ineffective in providing a performance property advantage in the resulting foam product made using the polyisocyanate prepared from DER 736.

Comp. Ex. P-C was prepared from an aromatic epoxide DER 331 with ISONATE™ 143L by following the procedure described in Example 1 of U.S. Pat. No. 7,714,030. This is a one-step synthesis of adding aromatic epoxide, catalyst and polyisocyanate into a one-reaction pot. The NCO % of the final product was approximately 23% and the viscosity of the product was determined to be 8.54 Pa-s at 25° C. This AOU-containing PP compound prepared from a polymeric ISONATE™ 143L with high AOU % and low NCO % was too viscous to process into a rigid foam (AOU=11.5 wt % based on calculation).

Comp. Ex. P-D shows that the use of same amount of PAPI 94, PAPI 580N with D.E.R.™ 332 in a one-step synthesis yielded a high viscosity AOU-containing PP compound compared to that of Inv. Ex. P-1. This demonstrates that a two-step addition of isocyanate for preparing AOU-containing PP compound (Inv. Ex. P-1) is more advantageous for achieving a low viscosity than a one-step addition process (Comp. Ex. P-D).

Comp. Ex. P-E shows that the use of high functionality polymeric PAPI 580N to react with D.E.R.™ 332 as first step and then mixed with low functionality polymeric PAPI 94 as second step yielded a much higher viscosity AOU-containing PP compound compared to that of Inv. Ex. P-1. This demonstrates that the sequence of adding low functionality polymeric MDI or high functionality polymeric MDI is important for achieving the low viscosity of the AOU-containing PP compound and the resulting polyisocyanate. The addition of a low functionality polymeric MDI in the first step followed by the addition of a high functionality polymeric MDI in the second is more advantageous for achieving a low viscosity AOU-containing PP compound and the resulting polyisocyanate.

Inv. Ex. P-2, Comp. Ex. P-F and Comp. Ex. P-G show that the use of polymeric PAPI 27 with D.E.R.™ 383 to be reacted as first step and then mixed with polymeric PAPI 27 as second step yielded a low viscosity polyisocyanate containing AOU-containing PP compound. A comparison between Inv. Ex. P-2, Comp. Ex. P-F and Comp. Ex. P-G shows that the viscosity of an AOU-containing PP compound can be further reduced by incorporating a lesser amount of oxazolidone structure into the polyisocyanate. However, when the amount of oxazolidone groups in the final polyisocyanate is too low, such as shown in Comp. Ex. P-F and Comp. Ex. P-G, no performance advantage in the PUR or PIR foam made from such a polyisocyanate is observed as shown later in the foam examples which follow herein below.

TABLE II

Oxazolidone Containing Polyisocyanates and Properties Thereof

| Inventive Examples (Inv. Ex.) and Comparative Examples (Comp. Ex.) | One-Step Process or Two-Step Process | COMPONENT | | | | | | | Properties of Final Polyisocyanate | | |
|---|---|---|---|---|---|---|---|---|---|---|---|
| | | Epoxide | | Catalyst | | Isocyanate A | | Isocyanate B | | Viscosity at 25° C. (Pa*s) | AOU % Calculated[4] | NCO (%) Calculated |
| | | Type | Amount (g) | Ph$_3$Sb (g) | I$_2$ (g) | Type | Amount (g) | Type | Amount (g) | | | |
| Comp. Ex. P[1]-A | One-Step | DER 383 | 11.6 | 0.26 | 0.35 | PAPI 27 | 106.6 | NA[3] | 0.0 | 37.0 | 10.4 | 26.0 |
| Comp. Ex. P-B[2] | Two-Step | DER 736 | 100 | 3.00 | 4.50 | ISONATE™ 50 O, P' | 400 | M600 | 723.95 | 1.0 | NA*[5] | 27.3 |
| Comp. Ex. P-C | One-Step | DER 331 | 13 | 1.5 | 0.5 | ISONATE™ 143L | 100 | NA | 0.0 | 8.54 | 11.5 | 23 |
| Inv. Ex. P-1 | Two-Step | DER 332 | 72.5 | 2.38 | 3.45 | PAPI 94 | 341.8 | PAPI 580N | 847.4 | 3.1 | 6.4 | 27.8 |
| Comp. Ex. P-D | One-Step | DER 332 | 72.5 | 2.38 | 3.45 | PAPA 94 PAPI 580N | 341.8 847.4 | NA | 0 | 4.24 | 6.4 | 27.8 |
| Comp. Ex. P-E | Two-Step | DER 332 | 72.5 | 2.38 | 3.45 | PAPI 580N | 847.4 | PAPI 94 | 341.8 | 4.68 | 6.4 | 27.8 |
| Inv. Ex. P-2 | Two-Step | DER 383 | 58.0 | 1.30 | 1.85 | PAPI 27 | 442.0 | PAPI 27 | 1200.0 | 1.00 | 3.6 | 29.5 |

TABLE II-continued

Oxazolidone Containing Polyisocyanates and Properties Thereof

| Inventive Examples (Inv. Ex.) and Comparative Examples (Comp. Ex.) | One-Step Process or Two-Step Process | COMPONENT | | | | | | | | Properties of Final Polyisocyanate | | |
|---|---|---|---|---|---|---|---|---|---|---|---|---|
| | | Epoxide | | Catalyst | | Isocyanate A | | Isocyanate B | | Viscosity at 25° C. (Pa*s) | AOU % Calculated[4] | NCO (%) Calculated |
| | | Type | Amount (g) | $Ph_3Sb$ (g) | $I_2$ (g) | Type | Amount (g) | Type | Amount (g) | | | |
| Comp. Ex. P-F | Two-Step | DER 383 | 58.0 | 1.30 | 1.85 | PAPI 27 | 442.0 | PAPI 27 | 2900.0 | 0.75 | 1.8 | 30.4 |
| Comp. Ex. P-G | Two-Step | DER 383 | 58.0 | 1.30 | 1.85 | PAPI 27 | 442.0 | PAPI 27 | 6300.0 | 0.41 | 0.9 | 30.9 |

Notes for Table II:
[1]The prefix "P" in the Examples and Comparative Examples denotes "polyisocyanate".
[2]P-C is made from an aliphatic epoxy and does not contain a rigid AOU.
[3]"NA" means that a second isocyanate compound was not used.
[4]The "AOU % Calculated" is the rigid backbone with oxazolidone rings as shown in Formula (I) in the chemical structure of the polyisocyanate shown in Formula (II).
[5]"NA*" means that no rigid or AOU was obtained and therefore no AOU % could be calculated.

The data described in Table II above shows that a polyisocyanate component (a) having an advantageous low viscosity can be prepared. This is achieved by minimizing the formation of undesirable compounds that can contribute to high viscosity even at just a small amount such as isocyanurate trimer materials, higher molecular weight compounds, highly branched oxazolidone-containing prepolymer, and the like. Furthermore, the data of Table II shows that the use of an aromatic epoxide to form the AOU-containing PP compound provides a polyisocyanate component (a) with a viscosity useful for processing a polyurethane foaming system containing the AOU-containing PP compound during the manufacturing of foam products for insulation applications such as insulated metal panels.

General Procedure for Foam Preparation

Polyol, surfactant, flame retardant, catalyst and water were added into a plastic cup and the plastic cup with its contents was weighed. Then, the cup contents were mixed with a high-speed overhead mixer (from Heidolph, Germany) to provide a "polyol package" (B-Side). A targeted amount of blowing agent was then added into the cup and thoroughly mixed with the polyol package. Subsequently, a desired amount of a polyisocyanate component (A-side) was added into the formulation mixture in the cup. The resultant complete formulation was immediately mixed with a high-speed overhead mixer at a mixer-speed of 3,000 rpm for 5 seconds (s) and then the mixed formulation was poured into a preheated mold which was preheated to 55° C. The size of the mold was 5 cm×20 cm×30 cm. The mold was placed vertically along the mold's length direction for foaming. The foam was removed from the mold after about 20 min and placed in a lab bench overnight prior to conducting physical properties testing on the resulting foam product.

Various tests were performed on the foam products made the Examples which follow including the following tests:

Viscosity

Viscosity measurements of the samples described in Table II were performed on a TA Instruments AR 2000ex rheometer with a pair of disposable aluminum plates of 40 mm diameter in parallel plates geometry. Viscosity data was collected at a constant oscillatory frequency of 6.28 rad/s, at a constant strain of 1%, and at a temperature ramp of from 20° C. to 50° C. at a ramp rate of 3° C./min. Viscosity values at the unit of Pa-s or mPa-s at 25° C. were reported.

Thermal Conductivity (K-Factor or Lambda Value)

Within 24 hours after the foams were made (and after an overnight sitting on the lab bench), foam specimens were cut into squares having a size of 20 cm×20 cm×2.5 cm. The thermal conductivity (K-factor) of each of the foam specimens was measured at 10° C. according to the procedure described in ASTM C518-04 (2010). The accuracy of K-factor measurements is typically within 0.1 mW/m*K. The average of K-factor measurements on two testing specimens was reported.

Foam Density

The density of rigid foam was measured according to the procedure described in ASTM 1622-03 (2008). Samples of the rigid foam were cut into cube specimens having a size of 5 cm×5 cm×5 cm. The samples were weighed and the exact dimension of each sample was measured. Then, the density of the samples was calculated.

Friability

The friability property of foams was measured by testing foam specimens in a tumbling machine according to the procedure described in ASTM C 421 (2014). The apparatus includes a cubical box of oak wood, having inside dimensions of 7½ inches by 7¾ inches by 7¾ inches (190 mm by 197 mm by 197 mm). The box shaft was motor driven at a constant speed of 60±2 revolutions/min. Twenty-four room-dry, solid oak, ¾±¹⁄₃₂-inch (19 mm±0.8-mm) cubes were placed in the box with the test specimens. The test specimens were prepared by cutting molded foams with a fine-tooth saw into 16±¹⁄₁₆-inch (25.4±1.6-mm) cubes.

FTIR

Infrared spectroscopy exploits the fact that molecules absorb specific optical frequencies due to the specific chemical bonding groups, the masses of the atoms and the associated vibrational mode. Attenuated total reflectance (ATR) is a sampling technique used in conjunction with infrared spectroscopy to enable the direct examination of samples in the solid or liquid state without any complex sample preparation. The instrument used in this test was a Perkin Elmer Spectrum Frontier FTIR Spectrometer. And, the ATR sampling technique used an ATR accessory which was a single bounce ATR with a diamond crystal through a deuterated triglycine sulfate (DTGS) detector. Approximately 15 mg of sample was transferred to the ATR and the infrared spectrum from 4,000 cm-1 to 650 cm-1 was collected using a resolution of 4 cm-1 for 8 or 16 scans.

In the oxazolidone-containing polyisocyanate, the reaction of epoxy groups with isocyanate groups was directly confirmed by the disappearance of epoxy peak at approximately (~) 915 cm-1 and the formation of a new absorption peak at 1,750-1,753 cm-1 that is characteristic to an oxazolidone structure.

NMR

About 100 mg of AOU-containing PP compound and 20 mg of Chromium(III) acetylacetonate (Cr(acac)$_3$) were dissolved in ~1 mL of deuterated chloroform (CDCl$_3$) at room temperature (about 25° C.) to obtain a homogenous solution. NMR data was acquired at room temperature on a Bruker Ascend 400 MHz spectrometer operating at a 13C resonance frequency of 100.6 MHz. A 5 mm BBO probe from Bruker Corporation (Billerica, Mass., USA) was employed. Chemical shifts are given in ppm relative to tetramethyl silane and referenced to residual protonated solvent (deuterated chloroform CDCl$_3$-d: dC 77.23 ppm). An inverse gated decoupling pulse program was employed with a 6 s recycle delay and 4,000 scans.

Using the above NMR analysis, the presence of epoxy signals (peaks at 50 ppm and at 44.5 ppm) could no longer be observed, which indicated that the epoxy conversion was >99%.

Cream Time and Gel Time

Cream time and gel time are determined according to the testing procedure described in ASTM D7487 (2013). The general procedure for the cream time and gel time measurements includes the following: A free rise foam is made by the plastic cup method described in the above ASTM reference. Using this method, polyols, surfactant, flame retardants, catalysts, and water are weighed into a plastic cup. A high-speed mixer is used to mix the polyol components. A proper amount of blowing agent is then and added into the cup and thoroughly mixed into the polyol side components. Isocyanate components are then added into the cup followed by immediate mixing using an overhead mixer at about 3,000 rpm for 5 s. The recording of time begins when the mixing of isocyanate and the polyol side mixture is triggered. When the foam formulation in the cup shows a distinct color or appearance change due to the formation of large number of bubbles or more commonly known as creaming by skilled artisans, the time is recorded as "Cream Time". The tip of a wood tongue depressor is then dipped into the foam formulation and quickly pulled out to check whether the foaming mixture becomes stringy. The time when the foaming formulation becomes stringy based on the wood tongue depressor testing is recorded as "Gel Time".

Example 1 and Comparative Examples A-C

Preparation of Foams of Inventive Example F-1 and Comparative Examples F-A to F-C The formulations described in Table III were used to prepare various rigid foam samples in accordance with the general procedure for preparing foams described above; and various tests were performed on the resultant foam samples. The results of the tests performed on the foams of Inv. Ex. and Comp. Ex. are shown in Table III.

TABLE III

Foams Prepared from Polyisocyanates With and Without Rigid AOU

| | Example | | | |
|---|---|---|---|---|
| | Comp. Ex. F*-A | Comp. Ex. F-B | Comp. Ex. F-C | Inv. Ex F-1 |
| | Brief Formulation Description | | | |
| | Conventional Polyisocyanate | Epoxy (No pre-formed AOU in Polyisocyanate) | Aliphatic Oxazolidone Containing Polyisocyanate | AOU- Containing Polyisocyanate |
| COMPONENT | | | | |
| PS3024 | 21.25 | 21.25 | 21.25 | 21.25 |
| PS2412 | 63.75 | 63.75 | 63.75 | 63.75 |
| TEP | 15 | 15 | 15 | 15 |
| SPE Surfactant 1 | 3 | 3 | 3.16 | 3.16 |
| Dabco K2097 | 1.9 | 2.05 | 2.05 | 2.05 |
| Polycat 5 | 1 | 1.07 | 1.07 | 1.07 |
| Water | 0.8 | 0.86 | 0.88 | 0.88 |
| Cyclopentane | 21 | 22.45 | 22.45 | 22.45 |
| VORANATE M600 | 260 | 116.19 | | |
| ISONATE ™ 50 O, P' | | 142.4 | | |
| D.E.R.332 | | 35.6 | | |
| P-B (AOU% NA) | | | 296 | |
| P-1 (AOU% = 6.4%) | | | | 285 |
| Isocyanate Index | | | 4.0 | |
| TEST RESULTS | | | | |
| Cream Time (s) | 10 | 10 | 10 | 9 |
| Gel Time (s) | 42 | 46 | 49 | 45 |
| Density (g/cm$^3$) | 41 | 40 | 44 | 38 |
| K mw/m*K at 10° C. | 20.4 | 21.8 | 20.5 | 19.1 |

Notes for Table III:
*The prefix "F" denotes "Foam" in the Inv. Ex. and Comp. Ex.

The foam example (Inv. Ex. F-1) and comparative foam examples (Comp. Ex. F-A, Comp. Ex. F-B, and Comp. Ex. F-C) were made by mixing the A-side and the B-side using an overhead mixer described earlier according to the formulation recipe described in Table III at an Isocyanate Index of 4.0. The foam of Inv. Ex. F-1 was prepared from an AOU-containing PP compound (Inv. Ex. P-1). The thermal conductivity of the foam prepared from the formulation of Inv. Ex. F-1 was found to be much lower than that of the comparative foam (Comp. Ex. F-A) that used a conventional polyisocyanate. A direct addition of free epoxide into the foam formulation as shown in Comp. Ex. F-B provided a foam product with an even higher thermal conductivity. Surprisingly, the thermal conductivity of the foam of Comp. Ex. F-C prepared from an aliphatic oxazolidone-containing polyisocyanate (Comp. Ex. P-B) was found to be non-effective in reducing thermal conductivity even though it contains an appreciable amount of oxazolidone structural content.

When a catalyst, that can promote the reaction of epoxide and isocyanate, was added into the foaming mixture and no reactive epoxide was added to the foaming mixture, the resulting foam collapsed; and when a catalyst and reactive epoxide were both added to the foaming mixture, the foam thermally decomposed in the core. The above data suggests that the pre-formed AOU incorporated into the polyisocyanate chain (e.g., by adding an AOU-containing PP compound, i.e., the polyisocyanate containing an AOU) contributes to lowering thermal conductivity of foams when compared with foams made with a polyisocyanate containing no AOU in the polyisocyanate chain.

Example 2 and Comparative Examples D to F

Preparation of Foams of Inventive Example F-2 and Comparative Examples F-D, F-E and F-F The foam formulations described in Table IV are foam-forming formulations containing various amounts of AOU (AOU %). The foam formulations were used to prepare various rigid foam products in accordance with the general procedure for preparing foams described above; and various tests were performed on the resultant foam products. The results of the tests are shown in Table IV.

TABLE IV

Foams Prepared from Polyisocyanates Containing Different Amounts of AOU %

| | FORMULATION Example | | | | | |
|---|---|---|---|---|---|---|
| | Comp. Ex. F-D | Comp. Ex. F-E | Inv. Ex. F-2 | Comp. Ex. F-F | Comp. Ex. F-LBA | Inv. Ex. F-LBA |
| COMPONENT | | | | | | |
| PS 3024 | 21.25 | 21.25 | 21.25 | 21.25 | 21.25 | 21.25 |
| PS 2412 | 63.75 | 63.75 | 63.75 | 63.75 | 63.75 | 63.75 |
| TEP | 15 | 15 | 15 | 15 | 15 | 15 |
| SPE Surfactant 1 | 3 | 3 | 3 | 3 | 3 | 3 |
| Dabco K2097 | 1.9 | 1.9 | 1.9 | 1.9 | 1.9 | 1.9 |
| Polycat 5 | 1 | 1 | 1 | 1 | 1 | 1 |
| Water | 0.8 | 0.8 | 0.8 | 0.8 | 0.8 | 0.8 |
| Cyclopentane | 21 | 21 | 21 | 21 | | |
| Solstice LBA | | | | | 42 | 42 |
| VORANATE M600 | | | | | 260 | |
| P-A (AOU % = 10.4) | | | | 310 | | |
| P-1 (AOU % = 6.4) | | | | | | 285 |
| P-2 (AOU % = 3.6) | | | 270 | | | |
| P-F (AOU % = 1.8%) | 265 | | | | | |
| P-G (AOU % = 0.9) | | 260 | | | | |
| Isocyanate Index | 4.0 | | | | | |
| TEST RESULTS | | | | | | |
| Cream time (s) | 9 | 10 | 9 | 9 | 11 | 11 |
| Gel time (s) | 47 | 47 | 45 | 39[1] | 45 | 49 |
| Density (g/cm$^3$) | 42 | 42 | 41 | nm[2] | 42 | 41 |
| K mw/m*K at 10° C. | 20.3 | 20.6 | 20.1 | nm[2] | 17.3 | 16.7 |

Notes for Table IV:
[1]Due to the very high viscosity of Isocyanate prepolymer P-A, the A-side cannot be mixed well with the B-side to get a homogeneous solution before foaming starts (Cream time).
[2]"nm"—The viscosity was too high to measure resulting in poor mixing and poor foam quality.

Density and thermal conductivity measurements were conducted on the foams prepared using the AOU-containing PP compound of the present invention with different AOU % and at an Isocyanate Index of 4 following the formulation recipe described in Table IV and the results of the measurements are also listed in Table IV. The results of density and thermal conductivity measurements are shown in Table IV. The results indicate that the use of an oxazolidone containing polyisocyanate with AOU % of more than 2.0% provides a noticeable benefit of a lower K-factor (i.e., a better thermal insulation performance) than a conventional polyisocyanate (e.g., Comp. Ex. F-A). However, when the amount of aromatic oxazolidone structure AOU % in the polyisocyanate is less than 2 wt %, little to no reduction of K-factor was observed as shown by the foam prepared from Comp. Ex. F-D and Comp. Ex. F-E, suggesting a minimal amount of oxazolidone content is required. In the foam preparation process using the formulation of Comp. Ex. F-F, the foaming formulation could not be properly mixed into a homogeneous reaction mixture in 5 s due to the use of the oxazolidone containing polyisocyanate of Comp. Ex. P-A which had too high of a viscosity (37 Pa-s at 25° C.). Longer duration of mixing between this high viscosity polyisocyanate and the polyol mixture would result in a more homogeneous mixture, however, this particular foam formulation as well as most industrially relevant foam formulations begin to cream and foam almost immediately after the 5 s mixing period. Hence, no good quality foam could be prepared from P-A polyisocyanate for measuring K factor.

A comparison between Inv. Ex. F-LBA versus Comp. Ex. F-LBA shows that the use of an AOU-containing PP compound also leads to a reduction of K-factor (e.g., a K factor reduction of 0.6 mw/m*K) for foams made from a hydrofluoro olefin (HFO) blowing agent such as Solstice LBA.

Example 3 and Comparative Example G

Preparation of Foams of Inventive Example F-3 and Comparative Example F-G

The foam formulations described in Table V were used to prepare rigid foam products for friability measurements. Both of the foams prepared from the formulations described in Table V were prepared through a high pressure machine foaming process with a Hi-tech Engineering—EcoRim machine. The polyols, catalysts, flame retardant additive, surfactants, water and physical blowing agents were premixed together according to the formulation described in Table V; and subsequently the resulting mixture was loaded into a first tank ("B-side"). The polyisocyanate was charged into a separate second tank ("A-side"). The "A-side" and "B-side" were mixed by impingement mixing at 1,500 psi pressure and the resulting foaming mixture was immediately injected into a 28-liter mold cavity with physical dimension of 10 cm (depth)×40 cm (width)×70 cm (length). The mold was preheated to 55° C. and kept at this temperature during the entire molding process of foam preparation. The final foams were removed out of the mold after 15 minutes and then conditioned at room temperature in a laboratory for at least 24 hours prior to any physical properties testing of the foams. The results of the tests are set forth in Table V.

TABLE V

Foam Examples Prepared from Oxazolidone Containing Polyisocyanates for Friability Measurements

|  | FORMULATION Example | |
| --- | --- | --- |
|  | Comp. Ex. F-G | Inv. Ex. F-3 |
| COMPONENT |  |  |
| Polyester polyol F | 21.25 | 21.25 |
| Polyester polyol O | 63.75 | 63.75 |
| TEP | 15 | 15 |
| SPE Surfactant 2 | 3 | 3.16 |
| Dabco K2097 | 1.84 | 2.03 |
| Polycat 5 | 0.97 | 1.07 |
| Water | 0.8 | 0.86 |
| Cyclopentane | 21 | 22.45 |
| VORANATE M600 | 260 |  |
| P-1(AOU % = 6.4) |  | 285 |
| Isocyanate Index | 4.2 |  |
| TEST RESULTS |  |  |
| Cream time (s) | 10 | 10 |
| Gel time (s) | 40 | 45 |
| Density (g/cm³) | 40 | 38 |
| 1-Friability (%) | 12.8 | 1.6 |

As shown by the results of Table V, foams prepared from the polyisocyanate containing the AOU-containing PP compound of the present invention showed a substantial improvement in their toughness as indicated by a much lower friability (e.g., from about 5-10× reduction in the mass loss) as shown in Table V.

What is claimed is:
1. A polyisocyanate component, comprising:
(a) a preformed mixture including an aromatic oxazolidone compound that is the reaction product of
(i) at least one epoxide compound having at least one aromatic group and
(ii) at least one first polyisocyanate compound having an average isocyanate functionality of no more than 2.7 and greater than 1.8, in the presence of
(iii) at least one catalyst, wherein the aromatic oxazolidone compound includes at least one free isocyanate group and at least one aromatic oxazolidone group, and wherein the aromatic oxazolidone group includes an aromatic group and an oxazolidone group; and
(b) at least one second polyisocyanate compound having an average isocyanate functionality equal to or greater than 2.7 and less than 6.0, the second polyisocyanate compound being added to the preformed mixture and mixed with the aromatic oxazolidone compound to form the polyisocyanate component,
wherein the polyisocyanate component has a viscosity of no more than 4.0 Pa-s at 25° C., wherein the content of the aromatic oxazolidone group in the polyisocyanate component is from 2 weight percent to 10 weight percent based on a total weight of the polyisocyanate component, and wherein the polyisocyanate component has an average isocyanate functionality of from 1.8 to 6.0.

2. The polyisocyanate component as claimed in claim 1, wherein the polyisocyanate component has an isocyanate equivalent weight of from 125 to 400.

3. The polyisocyanate component as claimed in claim 1, wherein the aromatic oxazolidone compound has the following structure of Formula (V):

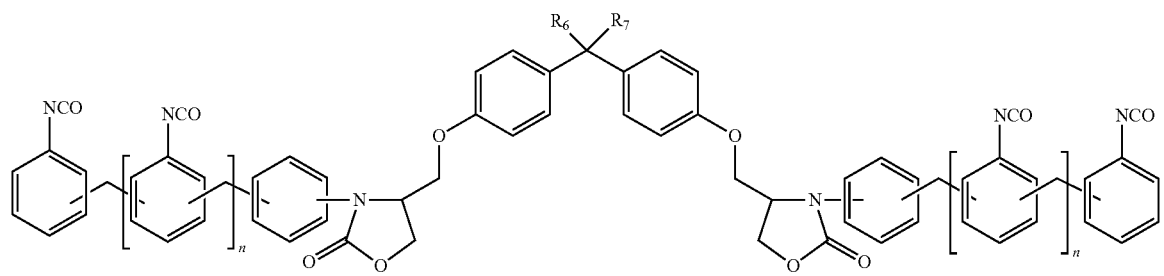

Formula (V)

where $R_6$ and $R_7$ are each independently a hydrogen (H), methyl ($CH_3$), or ethyl ($C_2H_5$) group and n is a numeral value of 0, or greater than or equal to 1.

4. The polyisocyanate component as claimed in claim 1, wherein the aromatic oxazolidone compound is prepared with a reaction mixture having an excess amount of isocyanate groups at a ratio of isocyanate groups to epoxide groups of from 3:1 to 30:1 on a molar basis.

5. The polyisocyanate component as claimed in claim 1, wherein the at least one catalyst is selected from $Ph_3SbI_4$, $Ph_3SbI_2$, quaternary ammonium, zinc carboxylate, organozinc chelate compound, trialkyl aluminum, quaternary phosphonium and ammonium salt, tertiary amine, imidazole compound, 1,8-diazabicyclo[5.4.0]undec-7-ene, and mixtures thereof.

6. The polyisocyanate component as claimed in claim 1, wherein the preformed mixture and the at least one second polyisocyanate are mixed at 80° C. or less.

7. The polyisocyanate component as claimed in claim 1, wherein the preformed mixture and the at least one second polyisocyanate are mixed at a weight ratio from 5:1 to 1:5.

8. A polyurethane foaming system comprising the polyisocyanate component as claimed in claim 1.

9. The polyurethane foaming system of claim 8, including a polyol component.

10. A process of using the polyisocyanate component as claimed in claim 1, the process comprising forming a rigid polyurethane foam by reacting a mixture of the polyisocyanate component as claimed in claim 1 and a polyol component that includes at least one polyol with an average hydroxyl functionality of at least 1.8, wherein a ratio of isocyanate groups to isocyanate-reactive groups in the mixture is at least 1.6.

11. A process of using the polyisocyanate component as claimed in claim 1, the process comprising:
providing a first metal facer; and
forming a rigid polyurethane foam on the first metal facer, the rigid polyurethane foam being the reaction product of a mixture of the polyisocyanate component as claimed in claim 1 and a polyol component that includes at least one polyol with an average hydroxyl functionality of at least 1.8, wherein a ratio of isocyanate groups to isocyanate-reactive groups in the mixture is at least 1.6.

12. The process as claimed in claim 11, further comprising providing a second metal facer on the rigid polyurethane foam to form an insulated metal panel.

\* \* \* \* \*